United States Patent [19]

Kijima et al.

[11] Patent Number: 4,874,185
[45] Date of Patent: Oct. 17, 1989

[54] VEHICLE SUSPENSION SUPPORTING CONSTRUCTION

[75] Inventors: Takao Kijima, Hiroshima; Takeshi Edahiro, Higashihiroshima, both of Japan

[73] Assignee: Mazda Motor Corporation, Hiroshima, Japan

[21] Appl. No.: 216,651

[22] Filed: Jul. 7, 1988

[30] Foreign Application Priority Data

Jul. 7, 1987 [JP] Japan .................. 62-104199

[51] Int. Cl.$^4$ .................. B60G 3/00; B60G 3/20
[52] U.S. Cl. .................. 280/690
[58] Field of Search .............. 280/690, 688, 700, 701, 280/

[56] References Cited

U.S. PATENT DOCUMENTS

| | | | |
|---|---|---|---|
| 4,327,927 | 5/1982 | Tanaka, et al. | 280/690 |
| 4,500,111 | 2/1985 | Woo | 280/690 |
| 4,671,531 | 6/1987 | Savtter, et al. | 280/690 |
| 4,754,992 | 7/1988 | Asanoma | 280/690 |

FOREIGN PATENT DOCUMENTS 6011807 1/1985 Japan .

Primary Examiner—Richard A. Bertsch
Attorney, Agent, or Firm—Fleit, Jacobson, Cohn, Price, Holman & Stern

[57] ABSTRACT

A double wishbone type suspension assembly of a vehicle is supported by a suspension supporting member through upper and lower control arms. The suspension supporting member comprises a cross member pivotally mounting the lower control arm and resiliently connected to a car body, and a supporting frame member pivotally mounting the upper control arm and resiliently connected to the car body, in particular to suspension tower of the car body. for resilient connection, a connecting mount which is prevented from being distorted laterally but is able to distort axially is provided between each member and the car body to be connected.

20 Claims, 4 Drawing Sheets

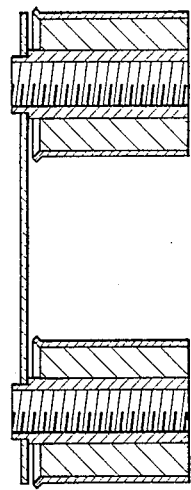
FIG. 7(A)
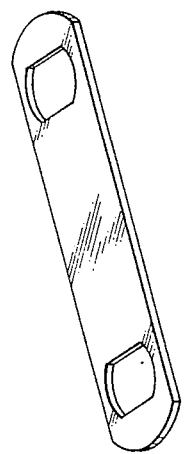
FIG. 7(A)
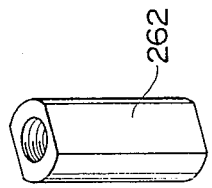
FIG. 5(B)
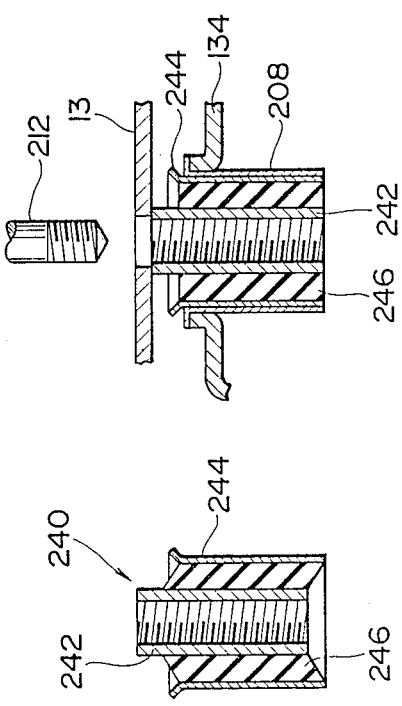
FIG. 5(A)
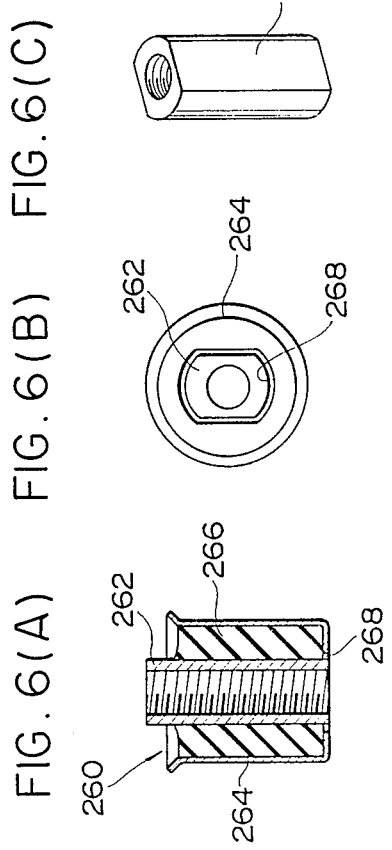
FIG. 6(C)
FIG. 6(B)
FIG. 6(A)

VEHICLE SUSPENSION SUPPORTING CONSTRUCTION

BACKGROUND OF THE INVENTION

The present invention relates to a suspension supporting construction for a vehicle.

Double wish-bone type suspensions are well known in the art. One such wish-bone type suspension is disclosed in, for example, Japanese Utility Model application No. 58-105,215 entitled "Suspension Arm Mounting Construction", filed June 6, 1983 and laid open to the public as Unexamined Publication No. 60-11807, Jan. 26, 1985. The prior suspension has a suspension member with its outer upper end attached to a front side member and a bracket disposed adjacent to the front side member and mounted on the outer upper end of the suspension member. Attached to the top of the bracket is a supporting member attached to both of a member of a car body and the front side member. There are upper and lower control arms, one end of the upper control arm being pivotally mounted on the bracket and one end of the lower control arm on the suspension member. The suspension thus constructed allows the transmission of load to front side member through the upper control arm and to the suspension member through the lower control arm.

In general suspensions, in an attempt at avoiding vibrations or shocks transmitted directly to the car body from wheels, the suspension member is mounted on the car body through an elastic member or members. The application of such a elastic member to the suspension of the above described prior art results in an fault that a vertical stress is exerted directly on a rigidly combined portion between the supporting member and the bracket.

OBJECT OF THE INVENTION

It is, therefore, an object of the present invention to provide a suspension in which an upper arm supporting member and a car body at their connection are independent on a vertical stress and is strengthened in side way rigidity.

SUMMARY OF THE INVENTION

According to the present invention, the above and other objects can be accomplished, in a vehicle suspension supporting construction having a suspension supporting member attached to a car body which pivotally mount upper and lower arms independently of each other, by connecting mount means for resiliently interconnecting the suspension supporting member and the car body. Specifically, the suspension supporting member includes a cross member for pivotally mounting the lower arm and a supporting frame member for pivotally mounting the upper arm, each member being connected to the car body through the connecting mount means which comprises inner and outer tubular members with an elastic member disposed between and integrated with these tubular members.

A particular feature of the present invention resides in the provision of the connecting mount means which prevents the car body from receiving a vertical stress from the suspension supporting member and can increase the rigidity of juncture between the car body and the suspension supporting member against a lateral stress.

Other objects of the invention and more specific features will become apparent to those skilled in the art from the following description of the preferred embodiment considered together with accompanying drawings.

BRIEF DESCRIPTION OF THE DRAWINGS

FIG. 5(A) is a cross sectional view of another embodiment of the connecting mount;

FIG. 5(B) is a cross sectional view of the connecting mount of FIG. 5(A), which is assembled between the supporting frame and the car body;

FIG. 6(A) is a cross sectional view of still another embodiment of the connecting mount;

FIG. 6(B) is a bottom plan view of the connecting mount of FIG. 6(A);

FIG. 6(C) is a perspective illustration showing an internally threaded inner tube used in the connecting mount of FIG. 6(A);

FIG. 7(A) is a cross sectional view of yet another embodiment of the connecting mount; and FIG. 7(B) is a perspective illustration showing a cross member for use with the connecting mounts of FIG. 7(A).

DETAILED DESCRIPTION OF THE INVENTION

The suspension according to a preferred embodiment of the present invention incorporates various elements similar to those of known suspensions of vehicles. Because such elements are well known to those skilled in the art, this description will be directed in particular to elements forming part of, or cooperating directly with, the suspension embodying the present invention. It is to be understood that elements not specifically shown or described can take various forms well known to those in the vehicle art.

Figure 1:
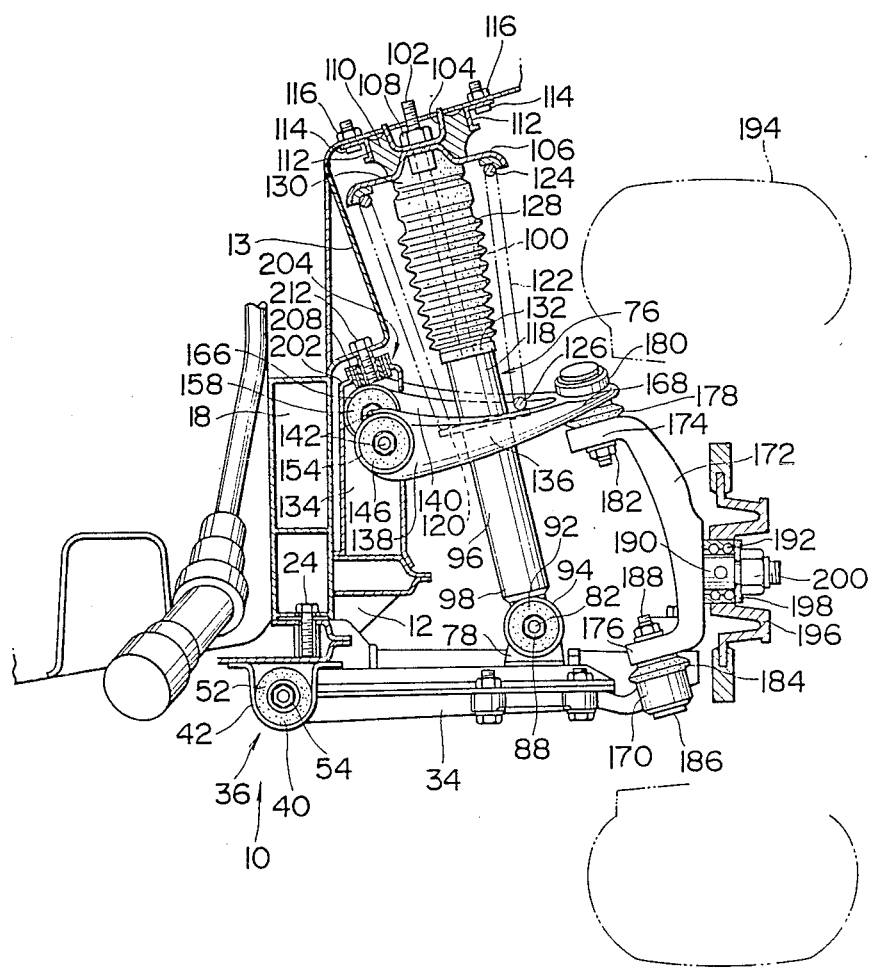
FIG. 1 is a front view of a vehicle suspension supporting construction of a preferred embodiment according to the present invention.
Figure 2:
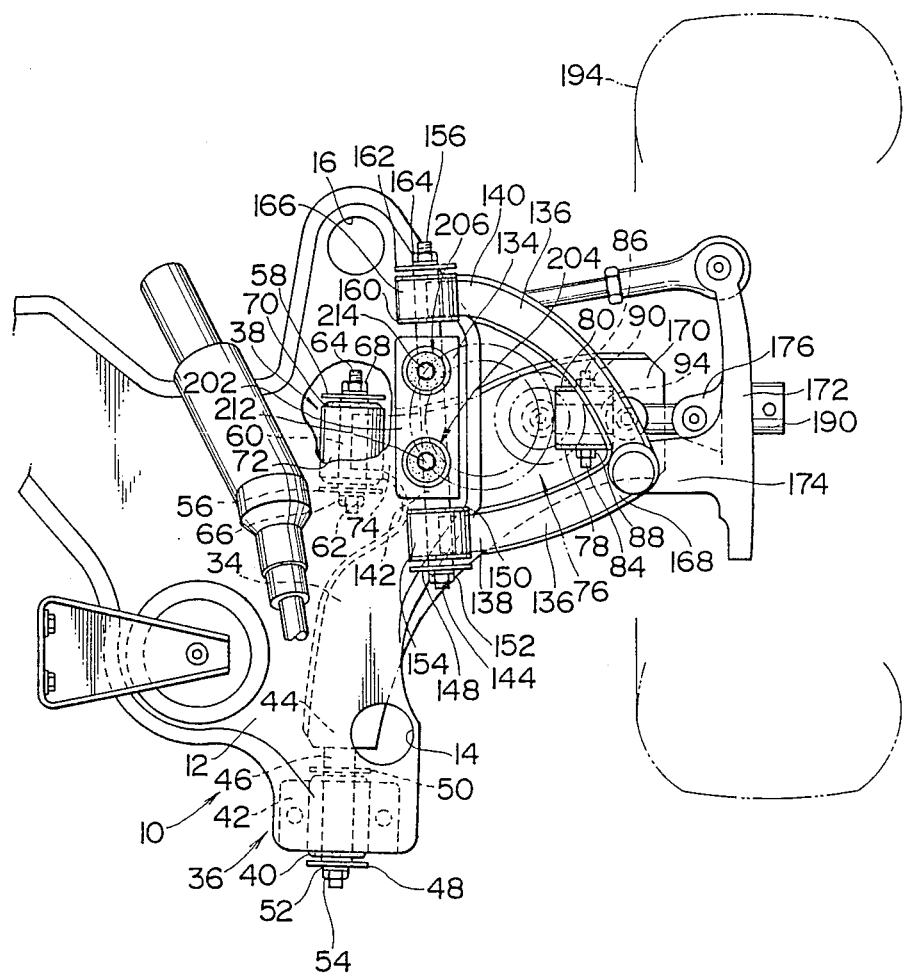
FIG. 2 is a top plan view of the vehicle suspension supporting construction of FIG. 1.
Figure 3:
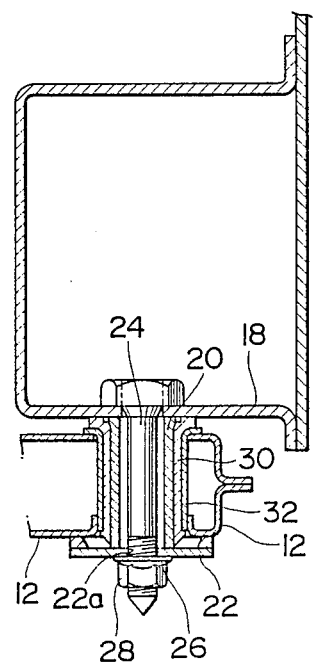
FIG. 3 is a cross sectional view showing a connecting mount between a suspension cross member and a car body.

Referring now to FIGS. 1 and 2, shown therein is a vehicle suspension, of the type having double wishbone control arms, of the present invention. As shown, a suspension member 10 for suspending a car body includes a suspension cross member 12 extending lengthwise which is in the form of a hollow frame and is attached to a front frame member 18 welded to a suspension tower 13 of the car body through resilient fitting assemblies at holes 14 and 16. As is shown in cross section in FIG. 3, each of the resilient fitting assemblies comprises inner and outer tubes 20 and 32, a sleeve-shaped elastic member 30 in the form of a bush disposed between and integrated with the inner and outer tubes 20 and 32, and a bottom plate 22 with a center hole 22a, which are fastened as one body to the under side of the front frame member 18 of the car body by means of a bolt 24, washer 26 and a nut 28. The suspension cross member 12 is secured to outer tube 32 through the hole 14, 16. Therefore, the suspension cross member 12 is resiliently connected to a bottom wall of the front frame member 18 of the car body by virtue of the elastic fitting assembly including the elastic bush 30, so that vibrations are prevented from being transmitted directly to the front frame member 18 of the car body from the suspension member 10.

The suspension cross member 12 on its front and rear sides is formed with mounts 36 and 38 for pivotally mounting a lower control arm 34 for swing motion. The mount 36 has a supporting member 42 with a sleeve-shaped elastic member 40 in the form of a bush firmly fitted therein. The supporting member 42 is secured to the suspension cross member 12. Fitted in the elastic bush member 40 is a shaft 46 formed at an inner end 44 of the lower control arm 34 which is fastened by a nut 54 through side holding plates 48 and 50 and washer 52 so as not to slip out. The other mount 38 has mounting brackets 56 and 58 which are secured to the suspension cross member 12 and support the opposite threaded ends 62 and 64 of a shaft 60 engaged with nuts 66 and 68, respectively. The shaft 60 is fitted in a sleeve-shaped elastic member 70 in the form of a bush which is firmly fitted in an outer tube 72 integrally formed with a front end of the lower control arm 34. The lower control arm 34 at the front and rear ends is resiliently supported by the suspension cross member 12 through the suspension mounts 36 and 38 including in each an elastic bush member for pivotal movement.

The lower control arm 34 is provided with supporting brackets 78 and 80 secured thereto for supporting the lower end of a shock absorber 76 which is well known in the art. Fastened to the supporting brackets 78 and 80 with nuts 88 and 90 are the opposite threaded ends 84 and 86 of a shaft 82. This shaft 82 is attached with a sleeve-shaped elastic member 92 in the form of a bush which is firmly fitted in an outer tube 94 formed integrally with the lower end 98 of a cylinder 96 of the shock absorber 76. By such a fitting construction, the shock absorber 76 at the lower end is resiliently supported by the lower control arm 34 for pivotal movement.

The cylinder 96 of the shock absorber 76 has a piston (not shown) with a piston rod 100 snugly inserted therein for axial movement. The piston rod 100 is provided with a supporting plate 104 and an upper spring retainer 106 secured to the threaded top end 102 thereof with a nut 108. Attached to surround the supporting plate 104 and the upper spring retainer 106 is an elastic member 110 held by a supporting ring tube 112 secured to the suspension tower member 13 of the car body by means of screws 114 and nuts 116. Owing to such a fitting construction, the shock absorber 76 at the top end is resiliently connected to the suspension tower member 13 of the car body.

Between the upper spring retainer 106 disposed at the top of the piston rod 100 and a lower spring retainer 120 disposed at the upper end 118 of the cylinder 96, there is disposed a compression spring 122. For a better protection of the piston rod 100, there is a bellows-like boot 128 covering the piston rod 100 which is retained at the top end 130 by the spring retainer 106 and at the lower end 132 by the top end 118 of the cylinder 96.

The suspension cross member 12 has an upper arm mounting frame 134 formed at its outer end for pivotally mounting inner ends 138 and 140 of an upper control arm 136. Specifically, the upper arm mounting frame 134 mounts a shaft 142 of which one threaded end 144 is attached with a sleeve-shaped elastic member 146 in the form of a bush by means of mounting plates 148 and 150 and a nut 152. This elastic bush member 146 is fitted in an outer tube 154 formed integrally with the upper control arm 136 at its inner end 138. Similarly, the other threaded end 156 of the shaft 142 is attached with a sleeve-shaped elastic member 158 by means of mounting plates 160 and a nut 162. This elastic bush member 158 is fitted in an outer tube 166 formed integrally with the upper control arm 136 at its opposite inner end 140. Owing to such a fitting construction, the upper control arm 136 is resiliently mounted on the suspension cross member 12 through the upper arm mounting frame 134.

The outer ends 168 and 170 of the upper and lower control arms 136 and 34 pivotally mount upper and lower ends 174 and 176 of a knuckle 172 through elastic members 178 and 184, respectively. Specifically, the knuckle 172 at its upper end 174 is mounted on the outer end 168 of the upper control arm 136 by means of screw 180 and nut 182 through the elastic member 178 so as to swing relative to the upper control arm 136. In a same construction as the upper end connection, the knuckle 172 at its lower end 176 is mounted on the outer end 170 of the lower control arm 34 by means of screw 186 and nut 188 through the elastic member 184 so as to swing relative to the lower control arm 34. Therefore, the knuckle 172 is supported by and swingable relative to the upper and lower control arms 136 and 34.

The knuckle 172 is provided with a shaft 190 projecting laterally outward. The shaft 190 of the knuckle 172 has a bearing 192 fixed thereto by means of a washer 198 and a nut 200 through which a wheel 194 is mounted on the shaft 190 through a hub 196 thereof for rotation.

Figure 4:
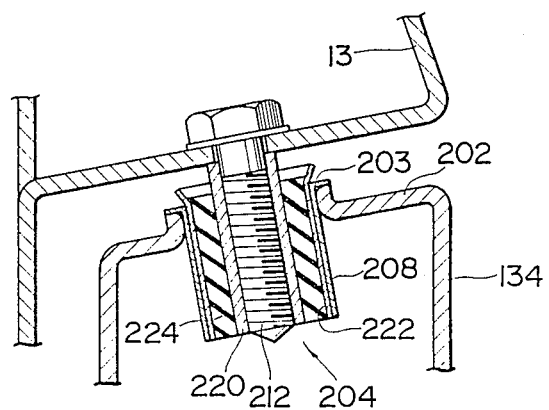
FIG. 4 is a cross sectional view showing a connecting mount between a supporting frame and the car body.

The upper control arm mounting frame 134 mounting the upper arm 136 is resiliently connected to the suspension tower 13 by means of bolts 212 and 214 screwed into a pair of connecting mount assemblies 204 and 206. As is shown in detail in FIG. 4, each mounting assembly 204, 206 comprises an internally threaded inner tube 220 an outer tube 222, and an elastic member 224 firmly inserted between the inner and outer cylindrical tubes 220 and 222, which are integrated as one body so as not to be taken apart from one another.

The connecting mount assembly 204 thus constructed is firmly fitted in a cylindrical mounting tube 208 which is rigidly fixed in a hole 203 formed in a top wall 202 of the upper arm supporting frame 134. For fitting the connecting mount assembly 204 in the cylindrical mounting tube 208 and fixing the cylindrical mounting tube 208 in the hole 203 of the top wall 202, any known manner, such as a welding or a caulking, may be taken. After assembling the suspension tower 13 and the upper control arm supporting member 134 in position, a bolt 212, 214 is driven tight to avoid its loosening, thereby connecting the upper control arm supporting frame 134 to the suspension tower 13. Owing to the use of the connecting mount assembly 204, 206 including the elastic member 224 integrated with the inner and outer tubes 220 and 222, the upper control arm supporting frame 134 is resiliently coupled to the suspension tower 13 attached to the front frame member 18 of the car body.

When fastening the bolt 212 in the inner tube 220, there may possibly occur a rotational motion of the inner tube 220 relative to the outer tube 222 which twists the elastic member 224 firmly built in the inner and outer tubes 220 and 222, resulting in a torsional distortion of the elastic member 224. If in fact the connection between the upper control arm supporting frame 134 and the suspension tower 13 is completed through the connecting mount assembly 204 with the elastic member 224 twisted and, thereby, having a torsional distortion, there is produced a twisting moment between the upper control arm supporting frame 134 and the suspension tower 13.

In attempt at overcoming such a rotational motion of the inner tube 220 which produces a torsional distortion of the elastic member 224, various improvements may be taken.

Referring to FIGS. 5(A) and 5(B) showing an alternation of the connecting mount assembly, a connecting mount assembly 240 comprises inner and outer tubes 242 and 244 which are structurally integrated by an elastic member 246 and, however, displaced in the axial direction as is shown in FIG. 5(A). The connecting mount assembly 240 is firmly fitted in the mounting tube 208. When assembling the upper control arm supporting frame 134 and the suspension tower 13, the elastic member 246 is axially distorted so as to axially press the top end of the inner tube 242 against the suspension tower 13 with a strong stress as is shown in FIG. 5(B). Due to the axial stress of the elastic member 246, the inner tube 242 is prevented from being rotationally turned when the bolt 212 is fastened therein.

FIGS. 6(A) to 6(C) show another embodiment of the connecting mount assembly. In this embodiment, the connecting mount assembly 260 comprises an internally threaded inner tube 262, an outer tubes 264 having a bottom wall formed with an opening 266 and an elastic member 268, which are integrated as one body. As is shown in FIG. 6(B), the inner tube 262 has a cross section similar to a rectangular with rounded short sides. The bottom opening 266 of the outer tube 264, which is formed in shape to be analogous to the cross section of the inner tube 262, receives therein the bottom end of the inner tube 262 so as to prevent the inner tube to turn relative to the outer tube 264. For easy assembling, it is permissible to leave a small gap between the inner periphery of the bottom opening 266 and the outer periphery of the inner tube 262.

FIGS. 7(A) and (B) show still another embodiment of the connecting mount assembly. Each of a pair of connecting mount assemblies 280 and 282 comprises an internally threaded inner tube 284, an outer tube 286 and an elastic member 288, which are integrated as one body. The inner tube 284, of which the outer shape is generally cylindrical, has a parallel sided top end. After firmly fitting the connecting mount assemblies 280 and 282 in the mounting tubes fixed to the upper control arm supporting frame 134, the inner tubes 284 of the pair of connecting mount assemblies 280 and 282 are coupled by means of a cross plate 290 (shown in FIG. 7(B)) having parallel sided holes 292 into which the top ends of the inner tubes 284. Owing to the provision of the cross plate 290, the connecting mount assembly, in particular the inner tubes 284 are prevented to turn when the bolts are fastened in the inner tubes 284.

Although the present invention has been fully described by way of the preferred embodiments thereof with reference to the accompanying drawings, it is to be noted that various changes and modifications are apparent to those skilled in the art. Therefore, unless otherwise such changes and modifications depart from the true scope of the present invention, they should be construed as included therein.

What is claimed is:

1. A suspension supporting construction for supporting a vehicle suspension apparatus having a wheel supporting member for supporting a wheel of a vehicle for rotation, upper and lower arms pivotally mounting upper and lower ends of the wheel supporting member, respectively, and a suspension supporting member for supporting the upper and lower arms for swingable motion so as to allow said wheel supporting member to move up and down relatively to a car body of said vehicle, said suspension supporting member comprising:

a cross member extending over the width of said car body and resiliently connected to said car body;

a supporting frame formed as an integral part of said cross member and extending upward from said cross member for pivotally mounting an inner end of said upper arm; and a connecting mount through which said supporting frame is resiliently connected to said car body.

2. A suspension supporting construction as defined in claim 1, wherein said cross member is connected to a front frame of said car body through a mounting member having an elastic rubber bushing.

3. A suspension supporting construction as defined in claim 2, wherein said cross member pivotally mounts an inner end of said lower arm.

4. A suspension supporting construction as defined in claim 1, wherein said connecting mount is disposed between a top end of said supporting frame and a suspension tower of said car body.

5. A suspension supporting construction as defined in claim 4, wherein said connecting mount includes an elastic bushing disposed in a near-vertical direction.

6. A suspension supporting construction as defined in claim 4, wherein said connecting mount comprises inner and outer tubes and elastic member disposed between and integrated with said inner and outer tubes, said outer tube being fixed to said supporting frame and said inner tube being fixed to said suspension tower.

7. A suspension supporting construction as defined in claim 4, wherein said connecting mount comprises an internally threaded inner tube, an outer tube and an elastic member disposed between integrated with said inner and outer tubes as one body, said outer tube being fixed to said supporting frame and said inner tube is bolted to said suspension tower.

8. A suspension supporting construction a defined in claim 7, wherein said elastic member is axially distorted.

9. A suspension supporting construction as defined in claim 7, wherein said connecting mount has means for preventing said inner tube from turning relative to said outer tube.

10. A suspension supporting construction as defined in claim 9, wherein said means comprises a parallel sided distal end of said inner tube and a parallel sided retaining opening defined by a flange inwardly extending from said outer tube which receives said parallel sided distal end of said inner tube.

11. A suspension supporting construction as defined in claim 9, wherein said means comprises parallel sided distal ends of said inner tubes of a pair of said connecting mounts and a cross plate formed with a pair of parallel sided retaining openings each of which receives each of said parallel sided distal end of said inner tube of said each connecting mount.

12. A suspension supporting construction as defined in claim 4, wherein a pair of said connecting mounts are disposed between said supporting frame and said suspension tower.

13. A suspension supporting construction as defined in claim 4, wherein said upper arm is of a wishbone type of which front and rear bushings are disposed on the opposite sides of said supporting frame and pivotally mounted on the opposite ends of a shaft supported by said supporting frame.

14. A suspension supporting construction for supporting a vehicle suspension apparatus having upper and lower arm for interconnecting a knuckle with a spindle on which a wheel is mounted for rotation, which comprises:

suspension supporting means comprising a cross member extending over the width of a car body of a vehicle for pivotally mounting said lower arm and a frame member formed as an integral part of said cross member and extending upward from said cross member for pivotally mounting said upper arm near the top thereof;

a first mounting member for resiliently interconnecting said cross member and a front frame of said car body; and a second mounting member for resiliently interconnecting said frame member and a suspension tower of said car body.

15. A suspension supporting construction as defined in claim 14, wherein said second mounting member is disposed in a near-vertical direction between said frame member and said suspension tower of said car body.

16. A suspension supporting construction as defined in claim 15, said second mounting member includes an elastic bush.

17. A suspension supporting construction as defined in claim 15, wherein said second mounting member comprises an inner tube, an outer tube, and an elastic member disposed between and integrated with said inner and outer tubes.

18. A suspension supporting construction as defined in claim 17, wherein said outer tube is fixed to said frame member and said inner tube is internally threaded and bolted to said suspension tower.

19. A connecting device for connecting a suspension supporting member pivotally mounting upper and lower arms so as to allow a knuckle member to move up and down relative to a car body of a vehicle to said car body, comprising:

an outer tube to be fixed to said suspension supporting member;

an internally threaded inner tube to be bolted to said car body; and an elastic member disposed between and integrated with said outer and inner tubes.

20. A connecting device as defined in claim 19, wherein said elastic member is shaped so as to axially distorted.

* * * * *